United States Patent [19]
Pandl et al.

[11] Patent Number: 4,973,671
[45] Date of Patent: Nov. 27, 1990

[54] DOUBLED COPPER FORMAZAN REACTIVE DYES CONTAINING A MONOFLUOROTRIAZINE OR MONOCHLOROTRIAZINE GROUP

[75] Inventors: Klaus Pandl, Ludwigshafen; Manfred Patsch, Wachenheim, both of Fed. Rep. of Germany

[73] Assignee: BASF Aktiengesellschaft, Ludwigshafen, Fed. Rep. of Germany

[21] Appl. No.: 267,348

[22] Filed: Nov. 4, 1988

[30] Foreign Application Priority Data

Nov. 5, 1987 [DE] Fed. Rep. of Germany ....... 3737537

[51] Int. Cl.$^5$ .................. C09B 50/00; C09B 62/095; D06P 1/382; D06P 3/66
[52] U.S. Cl. .................................. 534/618; 534/652; 534/583
[58] Field of Search ........................ 534/618

[56] References Cited

FOREIGN PATENT DOCUMENTS

| 3434818 | 4/1985 | Fed. Rep. of Germany | 534/618 |
| 2270304 | 5/1975 | France | 534/618 |
| 1163840 | 9/1969 | United Kingdom | 534/618 |
| 1502998 | 3/1978 | United Kingdom | 534/618 |
| 2148921 | 6/1985 | United Kingdom | 534/618 |

OTHER PUBLICATIONS

Houben–Weyl, Methoden der Organischen Chemie, vol. 10/2, 1967, pp. 487 and 488.

*Primary Examiner*—Floyd D. Higel
*Attorney, Agent, or Firm*—Oblon, Spivak, McClelland, Maier & Neustadt

[57] ABSTRACT

Double copper formazan reactive dyes of the formula

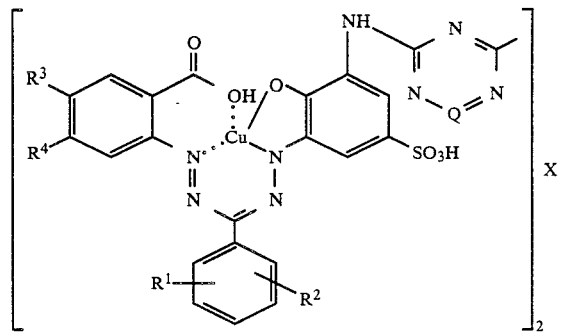

in which $R^1$ is hydrogen, hydroxylsulfonyl or chlorine; $R^2$ is hydrogen or hydroxylsulfonyl; one of two radicals $R^3$ and $R^4$ is hydrogen and the other is hydroxylsulfonyl; Q is fluorine or chlorine; and X is a radical of the formula

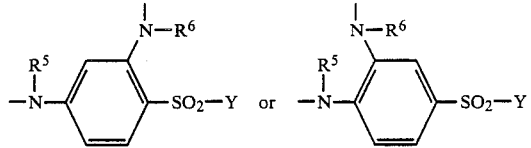

where $R^5$ and $R^6$ are identical or different and each is independently of the other hydrogen or unsubstituted or cyano- or hydroxyl-substituted $C_1$–$C_4$-alkyl and Y is hydroxyl or the radical $NR^7R^8$ where $R^7$ and $R^8$ are identical or different and each is independently of the other hydrogen or unsubstituted or cyano-, hydroxyl- or hydroxylsulfonyl-substituted $C_1$–$C_4$-alkyl, with the proviso that $R^5$ and $R^6$ are not both hydrogen, or salts thereof are useful for dyeing and printing hydroxyl- or nitrogen-containing organic substrates.

3 Claims, No Drawings

DOUBLED COPPER FORMAZAN REACTIVE DYES CONTAINING A MONOFLUOROTRIAZINE OR MONOCHLOROTRIAZINE GROUP

The present invention relates to novel doubled reactive dyes whose chromophore derives from a copper formazan dye and where the reactive group is a monofluoro- or monochlorotriazine system and to the use thereof for dyeing and printing hydroxyl- or nitrogen-containing organic substrates.

DE-A-No. 3,434,818 already discloses doubled copper formazan reactive dyes where the reactive system is a monochlorotriazine radical. It has been found, however, that the dyes described therein have inadequate application properties, for example insufficient solubility in the dyebath, low tinctorial strength and an inadequate color buildup on application in medium or deep shades.

It is an object of the present invention to provide new copper formazan reactive dyes which no longer have the abovementioned defects.

We have found that this object is achieved with a novel doubled copper formazan reactive dye of the formula I

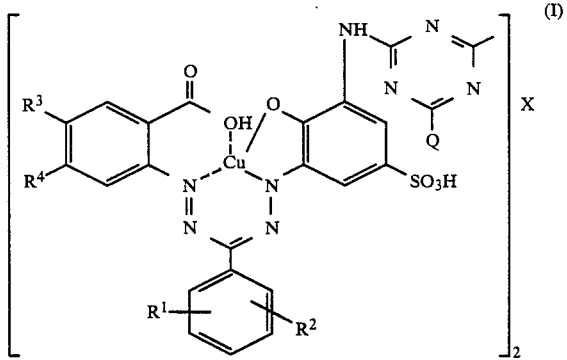

where
$R^1$ is hydrogen, hydroxysulfonyl or chlorine,
$R^2$ is hydrogen or hydroxysulfonyl,
one of the radicals $R^3$ and $R^4$ is hydrogen and the other hydroxysulfonyl,
Q is fluorine or chlorine and
X is a radical of the formula

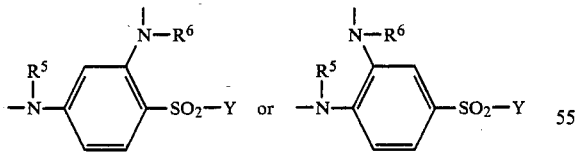

where $R^5$ and $R^6$ are identical or different and each is independently of the other hydrogen or cyano- or hydroxylsubstituted $C_1$–$C_4$-alkyl and Y is hydroxyl or the radical $NR^7R^8$ where $R^7$ and $R^8$ are identical or different and each is independently of the other hydrogen or unsubstituted or cyano-, hydroxyl- or hydroxysulfonyl-substituted $C_1$–$C_4$-alkyl, with the proviso that $R^5$ and $R^6$ are not both hydrogen, or a salt thereof.

Radicals $R^5$, $R^6$, $R^7$ and $R^8$ in formula I are each for example methyl, ethyl, propyl, isopropyl, butyl, isobutyl, sec-butyl, 2-cyanoethyl, 2- or 3-cyanopropyl, 1- or 2-cyanoprop-2-yl, 2- or 4-cyanobutyl, 2-hydroxyethyl, 2- or 3-hydroxypropyl or 2- or 4-hydroxybutyl.

Radicals $R^7$ and $R^8$ are each further for example 2-hydroxysulfonylethyl, 2- or 3-hydroxysulfonylpropyl or 2- or 4-hydroxysulfonylbutyl.

The radical Y is for example hydroxyl, amino, mono- or dimethylamino, mono- or diethylamino, mono- or dipropylamino, mono- or diisopropylamino, mono- or dibutylamino, N-methyl-N-ethylamino, mono- or bis(2-cyanoethyl)amino, mono- or bis(2-hydroxyethyl)amino, N-ethyl-N-(2-cyanoethyl)amino, N-ethyl-N-2-hydroxyethylamino, 2-hydroxysulfonylethylamino or N-ethyl-N-(2-hydroxysulfonylethyl)amino.

Salts which come into consideration for the salts of the copper formazan reactive dyes of the formula I are metal or ammonium salts. Metal salts are in particular the lithium, sodium or potassium salts. Ammonium salts for the purposes of the present invention are those salts which have either unsubstituted or substituted ammonium cations. Substituted ammonium cations are for example monoalkyl-, dialkyl-, trialkyl-, tetraalkyl- or benzyltrialkyl-ammonium cations or those cations which derive from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl for the purposes of the present invention is in general straight-chain or branched $C_1$–$C_{20}$-alkyl which may be substituted by hydroxyl and/or interrupted by oxygen atoms.

Preference is given to doubled copper formazan reactive dyes of the formula I where $R^1$ and $R^2$ are each hydrogen and X is a radical of the formula

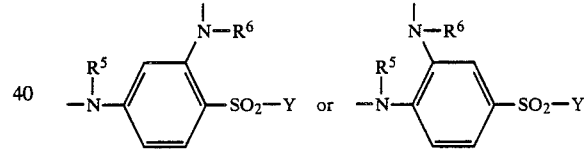

where in each case $R^5$ and $R^6$ are identical or different and each is independently of the other hydrogen, methyl or ethyl and Y is as defined above.

Preference is further given to those doubled copper formazan reactive dyes of the formula I where Q is chlorine.

Particular preference is given to doubled copper formazan reactive dyes of the formula I where $R^1$ and $R^2$ are each hydrogen and X is a radical of the formula

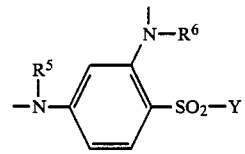

where $R^5$ and $R^6$ are each independently of the other hydrogen, methyl or ethyl and Y is hydroxyl.

Very particular prominence attaches to doubled copper formazan reactive dyes of the formula I where $R^1$ and $R^2$ are each hydrogen and X is a radical of the formula

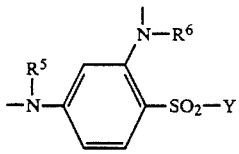

where $R^5$ is hydrogen, $R^6$ is methyl or ethyl and Y is hydroxyl.

The novel doubled copper formazan reactive dyes of the formula I can be prepared in a conventional manner. They are obtained for example by reacting cyanuric fluoride or chloride with a copper formazan dye of the formula II

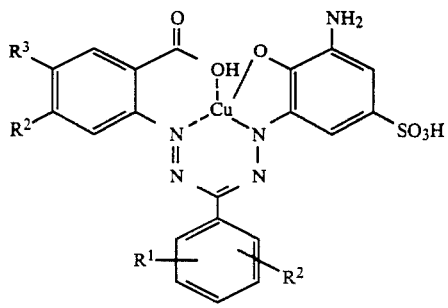

where $R^1$, $R^2$, $R^3$ and $R^4$ are each as defined above, to give a dye of the formula III

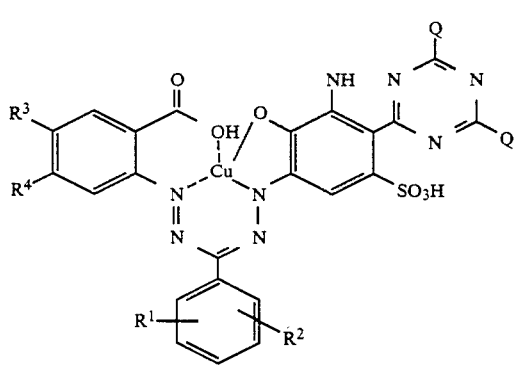

where Q, $R^1$, $R^2$ and $R^4$ are each as defined above, which is then further reacted with a diamine of the formula IV

  (IV)

where X is as defined above, to give a dye of the formula I according to the invention.

The copper formazan dye of the formula II can likewise be prepared in a conventional manner. It is obtained for example by coupling the diazonium salt of 1-hydroxy-2-amino-6-acetylaminobenzene-4-sulfonic acid with a phenylhydrazone of the formula V

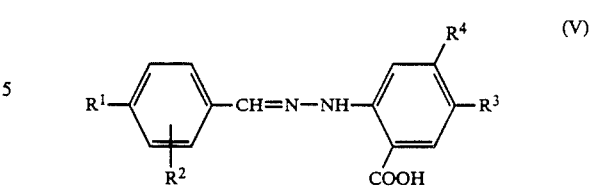

where $R^1$, $R^2$, $R^3$ and $R^4$ are each as defined above, then converting the reaction product into the copper complex by reaction with copper sulfate or copper chloride, and finally hydrolyzing the acetylamino group to give a free amino group (cf. Houben-Weyl, Methoden der Organischen Chemie, volume 10/2, 1967 pages 487 and 488).

Details of the preparation are given in the Examples.

The novel doubled copper formazan reactive dyes of the formula I are suitable for dyeing and printing hydroxyl- or nitrogen-containing organic substrates. Such substrates are for example leather or fiber material which predominantly contains natural or synthetic polyamides or natural or regenerated cellulose. The novel dyes are preferably suitable for dyeing and printing textile material based on cotton. They are dyed particularly advantageously on this fiber by the exhaust method.

The dyes according to the invention produce dyeings in medium blue shades. They are readily soluble and have a very high fastness level, in particular a high wet fastness. The color buildup in medium to deep dyeings is particularly high.

The following Examples will illustrate the invention in more detail:

EXAMPLE 1

39 g of cyanuric chloride were added to a solution of 124 g of the sodium salt of the compound of the formula

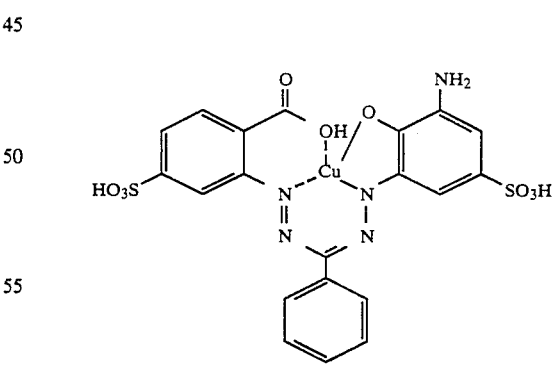

in 300 ml of water and 300 g of ice. The pH of the reaction mixture was maintained at from 5 to 5.5 until the end of the acylation by addition of sodium bicarbonate. After 2 hours 19 g of 4-amino-2-(N-methylamino)-benzenesulfonic acid, dissolved in 200 ml of water, were added. The suspension was heated to 60° C., and the pH was maintained at from 7 to 8 by adding sodium bicarbonate. After 3 hours the dye product of the formula

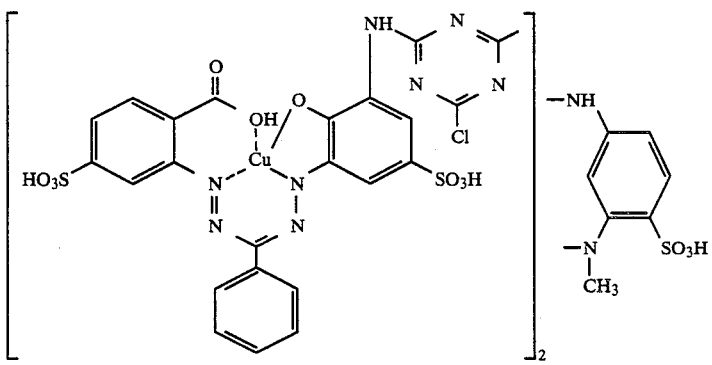

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative action.

EXAMPLE 2

39 g of cyanuric chloride were added to a solution of 124 g of the sodium salt of the compound of the formula

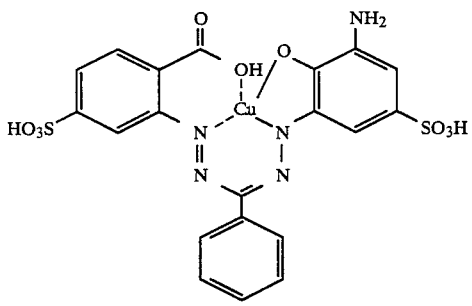

in 300 ml of water and 300 g of ice. The pH of the reaction mixture was maintained at from 5 to 5.5 until the end of the acylation by adding sodium bicarbonate. The suspension thus obtained was added to a solution of 19 g of 3-amino-4-(N-methylamino)benzenesulfonic acid in 200 ml of water which had previously been heated to 60° C. While maintaining this temperature, the pH of the reaction mixture was maintained at from 7 to 8 by adding sodium bicarbonate. After 5 hours the dye product of the formula was salted out with a mixture of sodium chloride and potassium chloride in the form of its sodium salt, filtered off and dried. The dark blue dye powder obtained is highly water-soluble and dyes cotton in bright blue shades. The dyeings are light- and wet-fast. They show remarkable stability to oxidative action.

EXAMPLE 3

32 g of trifluorotriazine were added to a solution of 124 g of the sodium salt of the compound of the formula

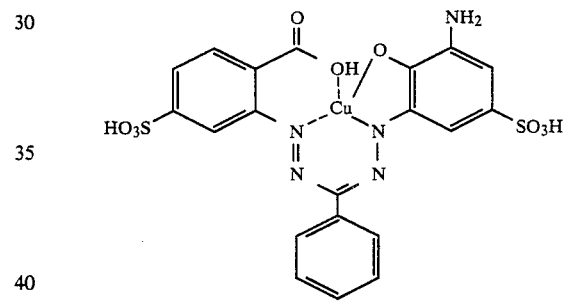

in 1200 ml of water at 0° C. The pH of the reaction mixture was held at from 4.9 to 5.2 until the end of the acylation by adding sodium hydroxide solution. After 20 minutes 19 g of 4-amino-2-(N-methylamino)benzenesulfonic acid, dissolved in 200 ml of water, were added at 15° C. The pH of the reaction mixture was maintained at 7 with sodium hydroxide solution. The temperature was raised to 20° C., and after 3 hours the dye product of the formula

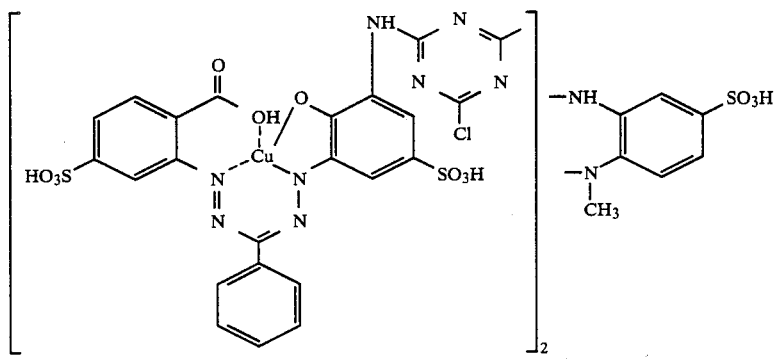

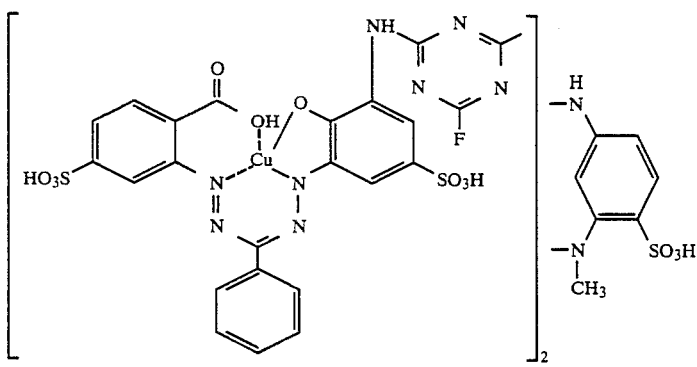

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative action.

The same method was used to obtain the sodium salts of the dyes of the formula

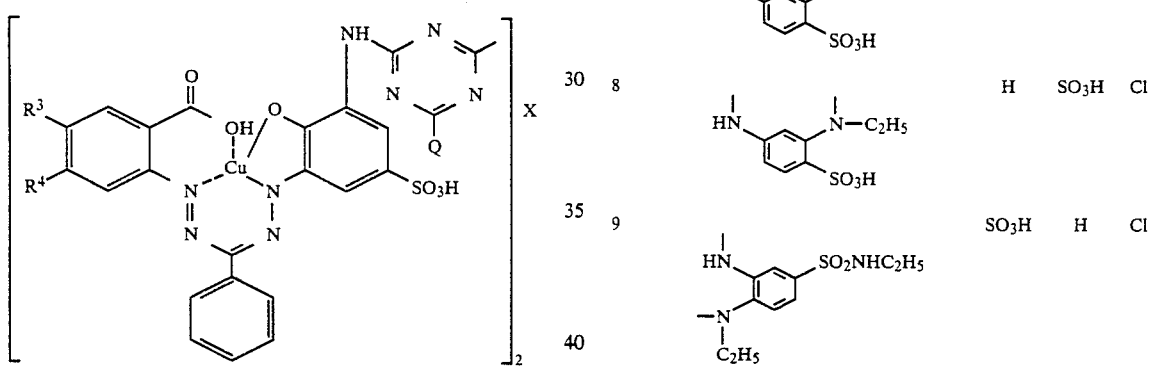

given in the table below. Applied by the conventional exhaust method, they dye cellulose fibers in blue shades. The dyes are very highly soluble in water, are light- and wet-fast and show good stability to oxidative action.

| Ex. No. | X | $R^3$ | $R^4$ | Q |
|---|---|---|---|---|
| 4 | HN—⬡(CH₃)(N—CH₃)(SO₃H) | SO₃H | H | Cl |
| 5 | HN—⬡(SO₂NHCH₃)(—N—CH₃) | SO₃H | H | Cl |
| 6 | HN—⬡(SO₂NHCH₃)(—N—CH₃) | H | SO₃H | Cl |
| 7 | HN—⬡(N—C₂H₅)(SO₃H) | SO₃H | H | Cl |
| 8 | HN—⬡(N—C₂H₅)(SO₃H) | H | SO₃H | Cl |
| 9 | HN—⬡(SO₂NHC₂H₅)(—N—C₂H₅) | SO₃H | H | Cl |
| 10 | HN—⬡(SO₂NHC₂H₅)(—N—C₂H₅) | H | SO₃H | Cl |
| 11 | HN—⬡(SO₃H)(—N—CH₃) | SO₃H | H | Cl |
| 12 | HN—⬡(SO₃H)(—N—C₂H₅) | SO₃H | H | Cl |
| 13 | HN—⬡(SO₃H)(—N—C₂H₅) | H | SO₃H | Cl |

-continued

| Ex. No. | X | R³ | R⁴ | Q |
|---|---|---|---|---|
| 14 | HN(H)–C₆H₃(SO₃H)–N(CH₃)(CH₂CH₂OH) | SO₃H | H | Cl |
| 15 | HN(H)–C₆H₃(SO₃H)–N(CH₃)(CH₂CH₂OH) | H | SO₃H | Cl |
| 16 | HN(H)–C₆H₃(NHCH₂CH₂OH)–N(CH₃)(CH₂CH₂OH) | SO₃H | H | Cl |
| 17 | HN(H)–C₆H₃(SO₂NHCH₂CH₂OH)–N(CH₃)(CH₂CH₂OH) | H | SO₃H | Cl |
| 18 | HN(H)–C₆H₃(SO₂NHCH₃)–N(CH₃)(CH₂CH₂OH) | SO₃H | H | Cl |
| 19 | HN(H)–C₆H₃(SO₂NHCH₃)–N(CH₃)(CH₂CH₂OH) | H | SO₃H | Cl |
| 20 | HN(H)–C₆H₃(SO₂NHCH₂CH₂SO₃H)–N(CH₃)(CH₃) | SO₃H | H | Cl |
| 21 | HN(H)–C₆H₃(SO₂CH₂CH₂SO₃H)–N(CH₃)(CH₃) | H | SO₃H | Cl |
| 22 | HN(H)–C₆H₃(SO₂NHCH₂CH₂SO₃H)–N(CH₃)(C₂H₅) | SO₃H | H | Cl |
| 23 | HN(H)–C₆H₃(SO₂NHCH₂CH₂SO₃H)–N(CH₃)(C₂H₅) | H | SO₃H | Cl |
| 24 | HN(H)–C₆H₃(SO₂NHCH₂CH₂SO₃H)–N(CH₃)(CH₂CH₂OH) | SO₃H | H | Cl |
| 25 | HN(H)–C₆H₃(SO₂NHCH₂CH₂SO₃H)–N(CH₃)(CH₂CH₂OH) | H | SO₃H | Cl |
| 26 | HN(H)–C₆H₃(SO₂NHCH₃)–N(CH₃)(CH₂CH₂OH) | SO₃H | H | Cl |
| 27 | HN(H)–C₆H₃(SO₂NHCH₃)–N(CH₃)(CH₂CH₂OH) | H | SO₃H | Cl |
| 28 | HN(H)–C₆H₃(SO₂NH₂)–N(CH₃)(CH₂CH₂OH) | SO₃H | H | Cl |
| 29 | HN(H)–C₆H₃(SO₂NH₂)–N(CH₃)(CH₂CH₂OH) | H | SO₃H | Cl |
| 30 | HN(H)–C₆H₃(N(CH₃)₂)(SO₃H) | SO₃H | H | F |
| 31 | HN(H)–C₆H₃(SO₂NHCH₃)–N(CH₃)(CH₃) | SO₃H | H | F |

| Ex. No. | X | R³ | R⁴ | Q |
|---|---|---|---|---|
| 32 | 3-(CH₃NH)-4-(N(CH₃)₂)-C₆H₃-SO₂NHCH₃ | H | SO₃H | F |
| 33 | 4-(N(CH₃)(C₂H₅))-3-SO₃H-C₆H₃-NH- | SO₃H | H | F |
| 34 | 4-(N(CH₃)(C₂H₅))-3-SO₃H-C₆H₃-NH- | H | SO₃H | F |
| 35 | 3-(CH₃NH)-4-(N(CH₃)(C₂H₅))-C₆H₃-SO₂NHC₂H₅ | SO₃H | H | F |
| 36 | 3-(CH₃NH)-4-(N(CH₃)(C₂H₅))-C₆H₃-SO₂NHC₂H₅ | H | SO₃H | F |
| 37 | 3-(CH₃NH)-4-(N(CH₃)₂)-C₆H₃-SO₃H | SO₃H | H | F |
| 38 | 3-(CH₃NH)-4-(N(CH₃)(C₂H₅))-C₆H₃-SO₃H | SO₃H | H | F |
| 39 | 3-(CH₃NH)-4-(N(CH₃)(C₂H₅))-C₆H₃-SO₃H | H | SO₃H | F |
| 40 | 3-(CH₃NH)-4-(N(CH₃)(CH₃))-C₆H₃-SO₃H | H | SO₃H | F |
| 41 | 3-(CH₃NH)-4-(N(CH₃)(CH₂CH₂OH))-C₆H₃-SO₃H | SO₃H | H | F |
| 42 | 4-(NHCH₂CH₂OH)-3-(CH₃NH)-C₆H₃-SO₃H | H | SO₃H | F |
| 43 | 3-(CH₃NH)-4-(N(CH₃)(CH₂CH₂OH))-C₆H₃-NHCH₂CH₂OH | SO₃H | H | F |
| 44 | 3-(CH₃NH)-4-(N(CH₃)(CH₂CH₂OH))-C₆H₃-SO₂NHCH₂CH₂OH | H | SO₃H | F |
| 45 | 3-(CH₃NH)-4-(N(CH₃)(CH₂CH₂OH))-C₆H₃-SO₂NHCH₃ | SO₃H | H | F |
| 46 | 3-(CH₃NH)-4-(N(CH₃)(CH₂CH₂OH))-C₆H₃-SO₂NHCH₃ | H | SO₃H | F |
| 47 | 3-(CH₃NH)-4-(N(CH₃)₂)-C₆H₃-SO₂NHCH₂CH₂SO₃H | SO₃H | H | F |
| 48 | 3-(CH₃NH)-4-(N(CH₃)₂)-C₆H₃-SO₂CH₂CH₂SO₃H | H | SO₃H | F |
| 49 | 3-(CH₃NH)-4-(N(CH₃)(C₂H₅))-C₆H₃-SO₂NHCH₂CH₂SO₃H | SO₃H | H | F |
| 50 | 3-(CH₃NH)-4-(N(CH₃)(C₂H₅))-C₆H₃-SO₂NHCH₂CH₂SO₃H | H | SO₃H | F |

-continued

| Ex. No. | X | R³ | R⁴ | Q |
|---|---|---|---|---|
| 51 | (HN-, -N(CH₂CH₂OH)- substituted phenyl with SO₂NHCH₂CH₂SO₃H) | SO₃H | H | F |
| 52 | (HN-, -N(CH₂CH₂OH)- substituted phenyl with SO₂NHCH₂CH₂SO₃H) | H | SO₃H | F |
| 53 | (HN-, -N(CH₂CH₂OH)- substituted phenyl with SO₂NHCH₃) | SO₃H | H | F |
| 54 | (HN-, -N(CH₂CH₂OH)- substituted phenyl with SO₂NHCH₃) | H | SO₃H | F |
| 55 | (HN-, -N(CH₂CH₂OH)- substituted phenyl with SO₂NH₂) | SO₃H | H | F |
| 56 | (HN-, -N(CH₂CH₂OH)- substituted phenyl with SO₂NH₂) | H | SO₃H | F |

We claim:
1. A doubled copper formazan reactive dye of the formula

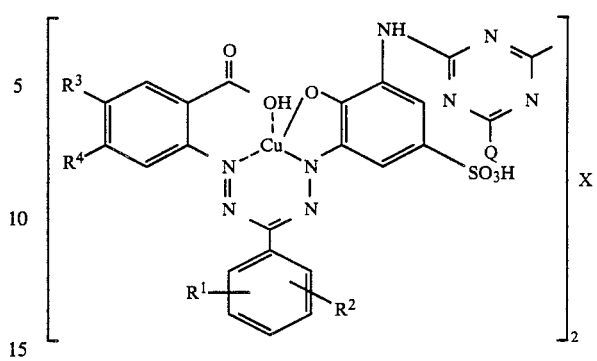

where
$R^1$ is hydrogen,
$R^2$ is hydrogen one of the two radicals $R^3$ and $R^4$ is hydrogen and the other hydroxysulfonyl,
Q is chlorine and
X is a radical of the formula

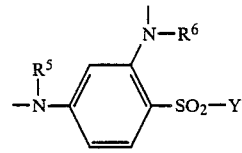

where $R^5$ and $R^6$ are identical or different and each is independently of the other hydrogen or unsubstituted $C_1$-$C_4$-alkyl and Y is hydroxyl or the radical $NR^7R^8$ where $R^7$ and $R^8$ are identical or different and each is independently of the other hydrogen or unsubstituted or cyano-, hydroxyl- or hydroxysulfonyl-substituted $C_1$-$C_4$-alkyl, with the proviso that $R^5$ and $R^6$ are not both hydrogen, or a salt thereof.

2. A doubled copper formazan reactive dye as claimed in claim 1, where $R^5$ and $R^6$ are identical or different and each is independently of the other hydrogen, methyl or ethyl with the proviso that $R^5$ and $R^6$ are not both hydrogen.

3. A doubled copper formazan reactive dye as claimed in claim 1, where $R^5$ and $R^6$ are each independently of the other hydrogen, methyl or ethyl and Y is hydroxyl, with the proviso that $R^5$ and $R^6$ are not both hydrogen.

* * * * *